Figure 1:
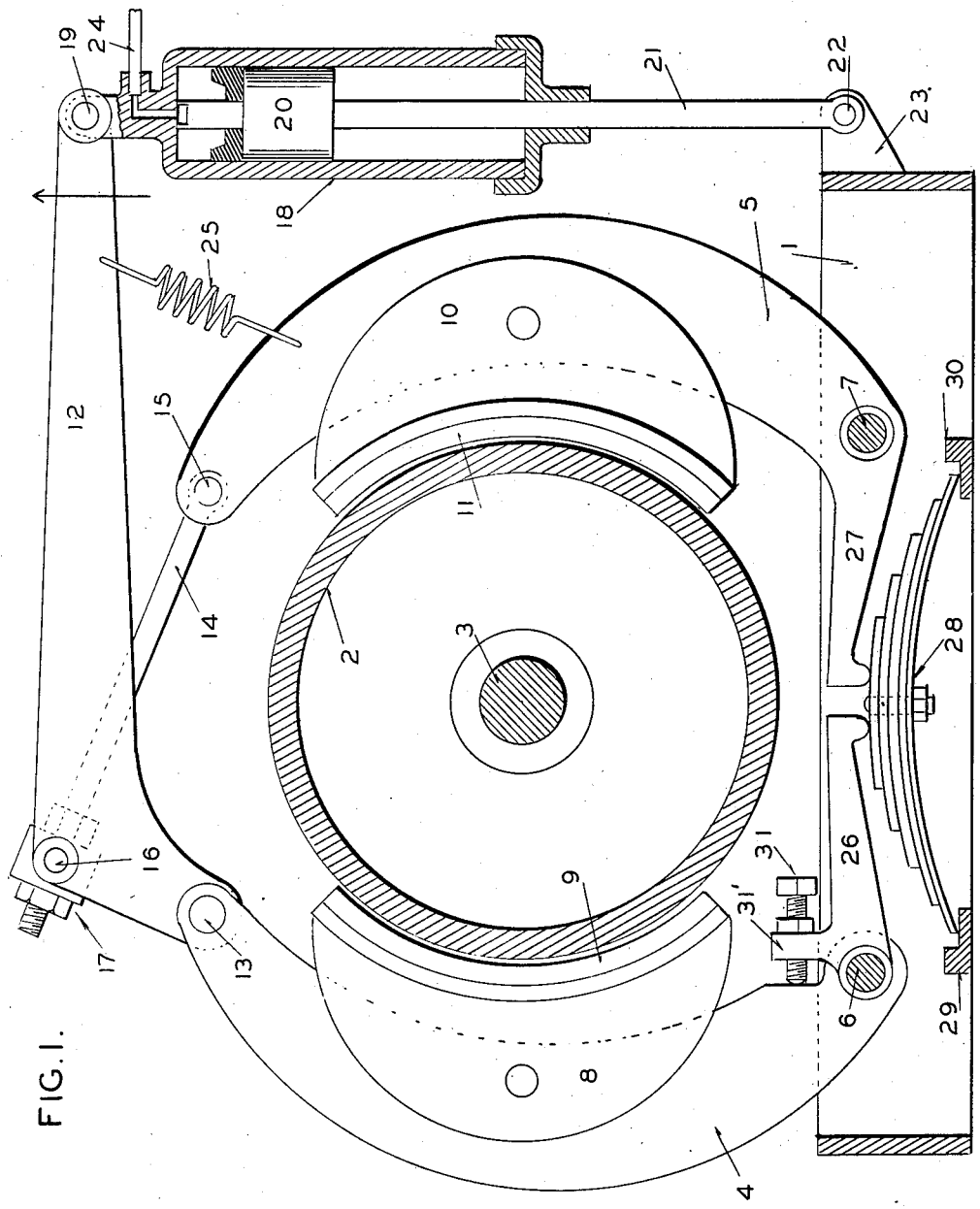

Dec. 18, 1945.     S. SCHNELL     2,391,074
CENTRALIZING MEANS FOR BRAKE SHOES
Filed March 16, 1944     2 Sheets-Sheet 1

INVENTOR
S. SCHNELL
BY
ATTORNEY

Dec. 18, 1945.  S. SCHNELL  2,391,074
CENTRALIZING MEANS FOR BRAKE SHOES
Filed March 16, 1944  2 Sheets-Sheet 2
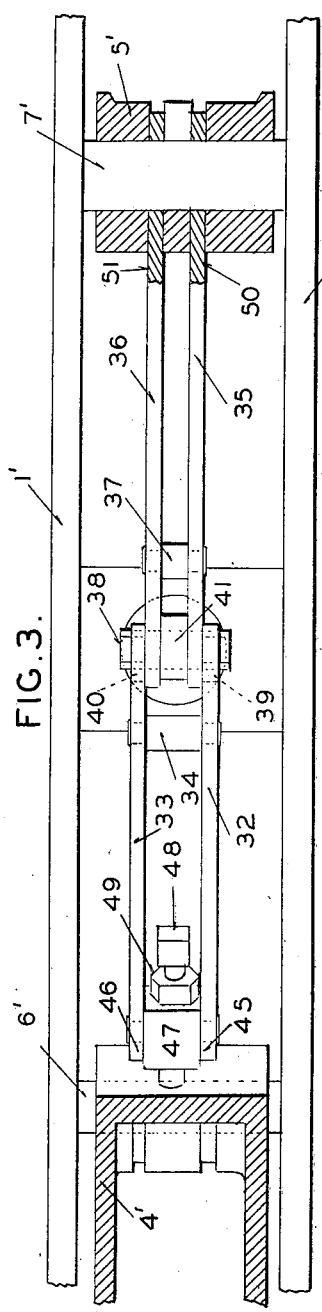
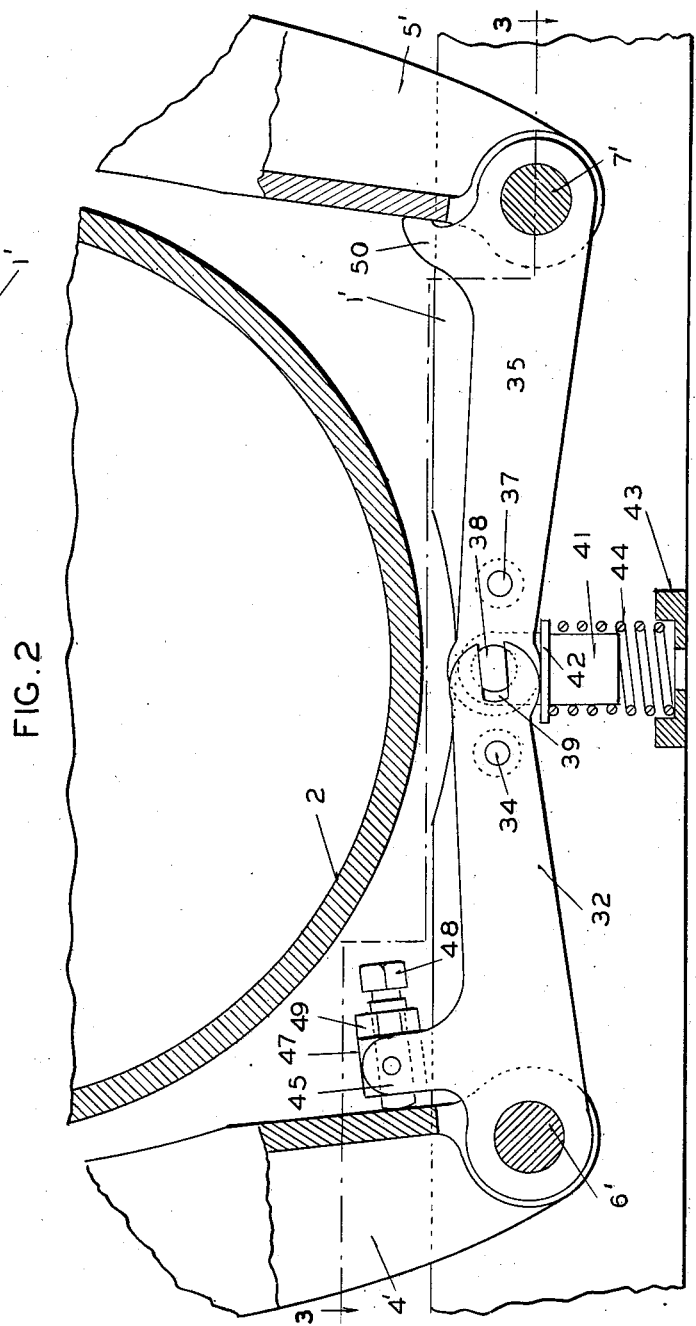
INVENTOR
S. SCHNELL
BY
ATTORNEY Patented Dec. 18, 1945

2,391,074

UNITED STATES PATENT OFFICE 2,391,074

CENTRALIZING MEANS FOR BRAKE SHOES

Steve Schnell, Kirkwood, Mo., assignor to Wagner Electric Corporation, St. Louis, Mo., a corporation of Delaware Application March 16, 1944, Serial No. 526,675

15 Claims. (Cl. 188—75)

My invention relates to brakes and more particularly to a centralizing means for two pivotally mounted shoes forming part of a brake.

One of the objects of my invention is to provide improved means for association with two pivoted brake shoes which will so act on both shoes as to cause their return to predetermined retracted positions when the brake is released without in any way interfering with said shoes being applied to the drum with equal pressures.

Another object of my invention is to provide spring-actuated means for centralizing two pivoted brake shoes with respect to the drum when said shoes are released, said means being so associated with the shoes as to permit independent movement when applied to the drum.

Still another object of my invention is to provide yieldable means for holding two brake shoes released from the drum and also preventing the shoes from simultaneously shifting relative to the drum when so released.

Other objects of my invention will become apparent from the following description taken in connection with the accompanying drawings in which Figure 1 is a side view, partly in section, of a brake having my invention for centralizing the shoes when released embodied therein; Figure 2 is a view showing a different construction for accomplishing the same result; and Figure 3 is a sectional view taken on the line 3—3 of Figure 2.

Referring first to Figure 1 in detail, numeral 1 indicates a base supporting member for the brake, said base being mounted beneath a brake drum 2 fixed to a rotating shaft 3 which is to be braked. Pivotally mounted on the supporting base are two levers 4 and 5 extending upwardly on opposite sides of the brake drum to a point above the top side of the brake drum. Pivot pins 6 and 7 are employed to pivot the levers to the base. Lever 4 has pivotally mounted thereon a brake shoe 8 provided with a friction lining 9 and lever 5 has pivotally mounted thereon a similar brake shoe 10 provided with a friction lining 11.

The means shown for actuating the brake shoes comprises an L-shaped lever 12 having the outer end of its short leg pivotally mounted on the upper end of lever 4 by means of a pin 13. A link 14 is pivotally connected at its one end to the upper end of lever 5 by a pin 15 and the other end of the link is pivotally connected to the heel end of lever 12 by a pin 16 which has an adjusting means 17 associated with it and the link. The outer end of the long arm of lever 12 is adapted to be actuated by a fluid motor which has its cylinder 18 pivotally connected to the lever by a pin 19 and its piston 20 connected by a piston rod 21 and a pivot pin 22 to a bracket 23 carried by the base. A conduit 24 leads from the fluid motor to a suitable source of pressure such as a master cylinder device. There is also provided a retracting spring 25 between levers 12 and 5 carrying brake shoe 10. When the shoes are permitted to be retracted, piston 20 of the fluid motor will abut the inner end of the cylinder and act as a stop.

From the above described structure which is a well-known type of industrial brake, it is seen that when fluid under pressure is applied to the fluid motor, lever 12 will be rotated in the direction of the arrow and the brake shoes applied to the drum to bring about a braking action. When the fluid pressure is released from the fluid motor, the retracting spring 25 will be effective to release the brakes. In this type of brake in which levers such as 4 and 5 are pivotally mounted on the base and the actuating means are supported on the levers, said levers and shoes are free to shift bodily whenever the brake shoes are released from the drum. In other words, there is no means provided which insures that both brake shoes will be held away from the drum when in released condition. Generally the brake shoe carrying levers will so shift that one of the brake shoes will lightly drag on the drum and the other brake shoe will be spaced from the drum. This, of course, is undesirable since it results in wear of the lining of the dragging brake shoe and undesirable braking action.

In accordance with my invention, I associate arms 26 and 27 with the lower ends of levers 4 and 5. Arm 26 is adapted to be pivotally mounted on anchor pin 6 for lever 4 whereas arm 27 is an integral extension of lever 5. The inner ends of arms 26 and 27 are arranged to be adjacent each other beneath the drum and to be acted upon by a spring 28 built up from a plurality of leaf elements. The ends of this spring are adapted to rest upon the cross-members 29 and 30 of the base.

Lever 26, which is pivotally mounted on pin 6, carries an adjusting screw 31 in a lug 31', the inner end of said screw being arranged to abut against a surface of lever 4. This arrangement permits transfer of force from arm 26 to lever 4 when the arm is being rotated in a counterclockwise direction as viewed in the figure or lever 4 to transfer force to arm 26 when the lever is rotated in a clockwise direction. The angular relationship between the lever and arm can be limitedly adjusted at will by the screw.

With the two arms and the spring associated with levers 4 and 5 in the manner just described, it is seen that spring 28 will be effective to always retract both brake shoes from the drum and to yieldably maintain levers 4 and 5 in centralized positions with respect to the drum. Any tendency of the shoes to shift simultaneously with respect to the drum will be yieldably opposed. By adjusting the means 17, the clearance of the two shoes can be made as desired. When the shoes are biased to retracted position, the piston 20 will be in abutment with the end of cylinder 18. Spring 28 does not in any way interfere with the application of the brakes except for what small force is necessary to compress the spring. When shoes 8 and 10 are applied to the drum by the actuation of the fluid motor, spring 28 will only be compressed by the downward movement of arms 26 and 27 as the levers move toward each other to apply the brake shoes. If the lining of one shoe should be worn more than the other so that the lever which carries said shoe has to move further to bring about braking action, this is permitted by the arrangement of the arms and spring 28. If, for example, the lining 11 of shoe 10 is worn the most so that lever 5 must rotate a greater distance than lever 4 to bring about equal pressure of the brake shoes, arm 27 will compress the spring and there will be no transfer of force from this arm to the other arm 26 and lever 5. The same will be true if lining 9 of the brake shoe 8 is worn the most so that lever 4 must have a greater rotation to apply the brake shoe with equal pressure than that of brake shoe 10. By means of the adjusting screw 31, initial adjustment can be made so that both brake shoes will have the same "off" position clearance with respect to the drum when they are released. If the lining of one shoe should wear more than the other, screw 31 can also be employed to compensate for this difference in wear so that both shoe clearances will be approximately the same, it being noted that since the upper ends of levers 4 and 5 are "tied" together, a shifting of lever 4 by the adjusting screw will also shift lever 5. The retracting spring 25 may be eliminated under conditions where it is not necessary to too greatly increase the resiliency of spring 28 to do its work.

Referring now to Figures 2 and 3, there is shown a slightly different construction for accomplishing the same result as that of the structure of Figure 1. As shown, the base 1' has pivotally mounted thereon, by means of pins 6' and 7', the brake shoe carrying levers 4' and 5'. Pivotally mounted on the pivot pin 6' are two similar arms 32 and 33 which are held together at their free ends by a combined pin and spacer 34. Pivoted on pin 7' are two like arms 35 and 36 which are held together at their free ends by the combined pin and spacer 37. The inner ends of arms 35 and 36 carry a pin 38 which extends on opposite sides of the arms so as to be received in slots 39 and 40 in the free ends of arms 32 and 33 which are so spaced as to lie on the outside of the free ends of arms 35 and 36. The pin 38 has pivotally mounted between the ends of arms 35 and 36, a spring-pressed guide stem 41 provided with a flange 42. Interposed between this flange and a cross-member 43 carried by the base is a coil spring 44 in which is received a part of the guide member. By means of this arrangement spring 44 can apply pressure to the inner ends of all the arms to push them upwardly toward the drum.

The arms 32 and 33 are provided with extensions 45 and 46 which extend upwardly along side the lower end of the brake shoe carrying lever 4'. Pivotally mounted between these extensions is a plug 47 in which is an adjusting screw 48, the inner end of which is adapted to abut against lever 4', thus providing an adjustable one-way connection between the lever and the arms. A lock nut 49 is associated with the adjusting screw. Arms 35 and 36 are also provided with upstanding projections 50 and 51 which are arranged to abut against the lower end of lever 5' to thus form a one-way connection between the arms and the lever.

From the foregoing description it is believed to be obvious that the structure operates to centralize the brake shoes in the same manner as shown in Figure 1. When the brakes are in released condition the shoes will be centralized by spring 44 acting through the arms. Whenever the brake shoes are applied, levers 4' and 5' will be moved toward each other and spring 44 will be compressed by the arms. If it is necessary for either lever 4' or 5' to move a greater distance than the other, this will be permitted by the one-way connection between the arms and levers. For example, if lever 5' must move further than lever 4', arms 32 and 33 will be moved by lever 5' and there will be no force transferred to rotate lever 4' since arm 32 is free to move away from the lever. A similar functioning of the apparatus would take place if it is necessary that the brake lever 4' move a greater distance than the brake lever 5' in order to apply the brake shoes with equal pressure. The adjusting screw 48 permits adjustment so that the friction linings of the brake shoes can be arranged to be equal distances from the brake drum when the brake is new or in the event adjustment is desired when one lining wears more rapidly than the other.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a brake drum, a support, two levers having brake shoes thereon pivotally mounted on the support for cooperation with the drum, actuating means including a pressure fluid motor interconnected with the levers for moving said shoes in opposite directions to engage said shoes with the drum, said pressure fluid motor including a stop means for limiting the extent both shoes can be released from the drum but being ineffective to prevent simultaneous shifting of the levers about their pivots relatively to the drum when released, and means cooperating with means on said levers for causing both shoes when permitted to assume fully released condition as determined by the stop means to be in positions free of the drum, said means embodying arm means operatively associated with the levers permitting independent movement of the lever mounted shoes when actuated in order to engage the drum with equal pressures.

2. In braking apparatus, a brake drum, a support, two levers having brake shoes thereon pivotally mounted on the support for cooperation with the drum, actuating means including a pressure fluid motor interconnected with the levers for moving said shoes in opposite directions to engage said shoes with the drum, said pressure fluid motor including a stop means for limiting the extent both shoes can be released from the drum but being ineffective to prevent simultaneous shifting of the shoes about their pivots relatively to the drum when released, arms connected to said levers to be moved with said levers when said shoes engage with the drum, resilient means engaging said arms to cause both shoes to be moved to positions where both shoes are substantially equally spaced from the drum when said shoes are in fully released condition, and means permitting independent movement of the arms and levers in order that said shoes can be applied to the drum with equal pressures.

3. In braking apparatus, a brake drum, a support, two levers having brake shoes thereon pivotally mounted on the support for cooperation with the drum, actuating means including a pressure fluid motor interconnected with the levers for moving said shoes in opposite directions to engage said shoes with the drum, said pressure fluid motor including a stop means for limiting the extent both shoes can be released from the drum but being ineffective to prevent simultaneous shifting of the levers about their pivots relatively to the drum when released, and resilient means acting on arms operatively connected to the levers to yieldably maintain both shoes in fully released condition as permitted by the stop means and yieldably so held against simultaneous shifting as to be free of the drum, said last named means permitting the independent movement of the levers and shoes in order to be capable of engaging the drum with equal pressure.

4. In braking apparatus, a brake drum, a support, two levers having brake shoes thereon pivotally mounted on the support for cooperation with the drum, means including a pressure fluid motor interconnected with both levers for simultaneously actuating said lever mounted shoes into engagement with the drum, said pressure fluid motor including a stop means for limiting the total "off" position clearances of both shoes but not restricting the simultaneous shifting of the levers about their pivots and relatively to the drum when the shoes are released, and means comprising spring means acting on arms associated with each of said levers when released for yieldably holding said shoes positioned away from the drum a substantially equal distance and also yieldably preventing the simultaneous shifting of the levers relatively to the drum.

5. In braking apparatus, a brake drum, a support, two levers having brake shoes thereon pivotally mounted on the support for cooperation with the drum, actuating means including a pressure fluid motor interconnected with the shoes for moving said shoes in opposite directions to engage said shoes with the drum, said pressure fluid motor including a stop means for limiting the extent both shoes can be released from the drum but being ineffective to prevent simultaneous shifting of the levers about their pivots relatively to the drum when released, and means acting on the levers to yieldably maintain both shoes in fully released condition as permitted by the stop means and yieldably so held against simultaneous shifting as to be free of the drum, said last named means comprising arm members operatively connected with each of the levers when engaged with the drum and spring means for applying pressure to both arm members.

6. In braking apparatus, a brake drum, a support, two levers having brake shoes thereon pivotally mounted on the support for cooperation with the drum, actuating means including a pressure fluid motor interconnected with the levers for moving said shoes in opposite directions to engage said shoes with the drum, said pressure fluid motor including a stop means for limiting the extent both shoes can be released from the drum but being ineffective to prevent simultaneous shifting of the levers about their pivots relatively to the drum when released, arms connected to and movable with the levers when engaged with the drum, means associated with the arms to cause both shoes to be moved to positions where both shoes are substantially equally spaced from the drum when said levers are in fully released condition, said arm means so constructed and arranged to permit independent movement of each arm and lever in order that said shoes can be applied to the drum with equal pressures, and adjusting means for changing the relationship between one arm and the lever to which it is connected.

7. In braking apparatus, a brake drum, a support, two brake shoes pivotally mounted on the support for cooperation with the drum, means for actuating said shoes into engagement with the drum comprising lever and link mechanism connected to move the shoes relatively to each other, a pressure fluid motor connected to said lever and link mechanism, said pressure fluid motor comprising a stop means for limiting the total "off" position of the shoes when permitted to be released by the actuating means, said actuating means and stop means being so associated with the shoes as to be ineffective in preventing simultaneous shifting of the shoes relatively to the drum when released, spring means, and means operatively connecting the spring means with the shoes so that said spring means can simultaneously apply force to both shoes to yieldably hold them by cooperation with the stop means in positions where both shoes are substantially equally spaced from the drum, said last named means permitting independent movement of each shoe to engage the drum.

8. In braking apparatus, a brake drum, a support, two levers, means pivotally mounting the end of each lever on the support, friction means carried by each lever for cooperation with the drum, means carried by the other ends of the levers for actuating said levers and the friction means into engagement, pressure fluid motor means for operating said actuating means, said pressure fluid motor comprising a stop means for limiting the extent the levers and friction means can be released from the drum, arms connected to the levers and capable of transferring a force to the levers to move them away from the drum, and spring means acting on the arms, said spring means and arms being so associated that the spring means can simultaneously act on the arms to bias the levers and friction means to positions where both friction means are substantially equally spaced from the drum but permitting independent movement of the levers toward the drum when actuated.

9. In braking apparatus, a brake drum, a support, two levers, means pivotally mounting one end of each lever on the support, friction means carried by each lever for cooperation with the drum, an actuating lever pivoted to the other end of one of the two levers, a link pivotally connecting the actuating lever to the other end of the other of the two levers, pressure fluid motor means for moving the actuating lever, said pressure fluid motor comprising a stop means for limiting the extent the said two levers and friction means can be released from the drum, arms connected to each of the two levers adjacent their pivots and capable of transferring a force to the levers to move them away from the drum, and single spring means acting on the arms, said spring means and arms being so associated that the spring means can simultaneously act on the arms to bias the levers and friction means to positions where both friction means are substantially equally spaced from the drum but permitting independent movement of the two levers toward the drum when actuated.

10. In braking apparatus, a brake drum, a support, two levers, means pivotally mounting one end of each lever on the support, friction means carried by each lever for cooperation with the drum, an actuating lever pivoted to the other end of one of the two levers, a link pivotally connecting the actuating lever to the other end of the other of the two levers, means for moving the actuating lever, stop means associated with the actuating lever for limiting the extent the said two levers and fricion means can be released from the drum, arms connected to each of the two levers adjacent their pivots and capable of transferring a force to the levers to move them away from the drum, a single spring means acting on the arms, said spring means and arms being so associated that the spring means can simultaneously act on the arms to bias the levers and friction means to positions where both friction means are spaced from the drum but permitting independent movement of the two levers toward the drum when actuated, and adjusting means for changing the angular relation between an arm and its lever.

11. In braking apparatus, a brake drum, two pivotally mounted levers having brake shoes thereon adapted to be actuated in cooperation with the drum, an arm operatively connected with each lever so as to transmit a force to the shoe to move it away from the drum, said arms having their ends adjacent each other and capable of relative movement, means to adjust one of said arms with respect to its associated lever, and a single spring means simultaneously applying equal force to the arms to bias them and the shoes when released to positions where both shoes are equally spaced from the drum.

12. In braking apparatus, a brake drum, two pivotally mounted arms having brake shoes thereon adapted to be actuated in cooperation with the drum, an arm operatively connected with each lever so as to transmit a force to the shoe to move it away from the drum, said arms having their ends adjacent each other and capable of relative movement, means to adjust one of said arms with respect to its associated lever, and a leaf spring contacting the adjacent ends to simultaneously apply equal force to the arms to bias them and the shoes when released to positions where both shoes are spaced from the drum.

13. In braking apparatus, a brake drum, two pivotally mounted levers having brake shoes thereon adapted to be actuated in cooperation with the drum, an arm operatively connected with each lever so as to transmit a force to the shoe to move it away from the drum, said arms having their ends adjacent each other and capable of relative movement, a single spring means simultaneously applying equal force to the adjacent ends of said arms to bias them and the shoes when released to positions where both shoes are spaced from the drum, and adjusting means for changing the relative positions of one arm and the lever to which it is operatively connected.

14. In braking apparatus, a brake drum, two pivotally mounted brake shoes adapted to be actuated in cooperation with the drum, an arm mounted on each shoe pivot, a one-way force transmitting connection between each arm and a shoe so as to permit the arm to apply a force tending to retract the shoe, a pivotal connection between the arms, and a spring acting to apply a force to the pivotal connection and in a direction to move both shoes away from the drum when in released condition.

15. In braking apparatus, a brake drum, two pivotally mounted brake shoes adapted to be actuated in cooperation with the drum, an arm mounted on each shoe pivot, a one-way force transmitting connection between each arm and a shoe so as to permit the arm to apply a force tending to retract the shoe, an adjustment for one of the one-way connections to thereby permit the relative positions of a shoe and arm to be changed, a pivotal connection between the arms, and a spring acting to apply a force to the pivotal connection and in a direction to move both shoes away from the drum when in released condition.

STEVE SCHNELL.